June 17, 1930.   C. D. CUTTING   1,764,829
UNIVERSAL JOINT
Filed July 11, 1927
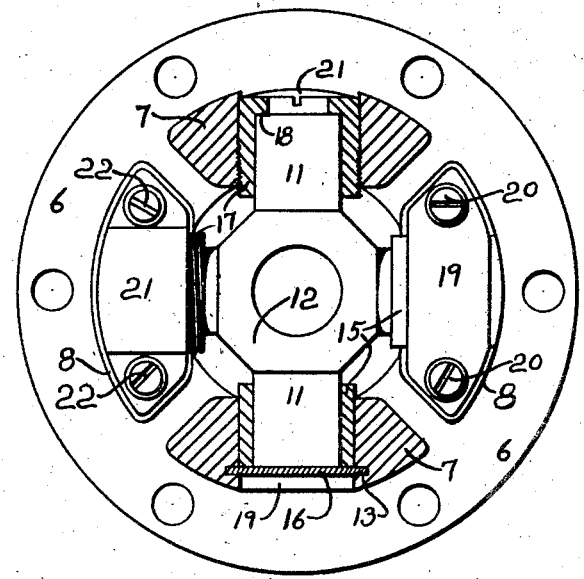
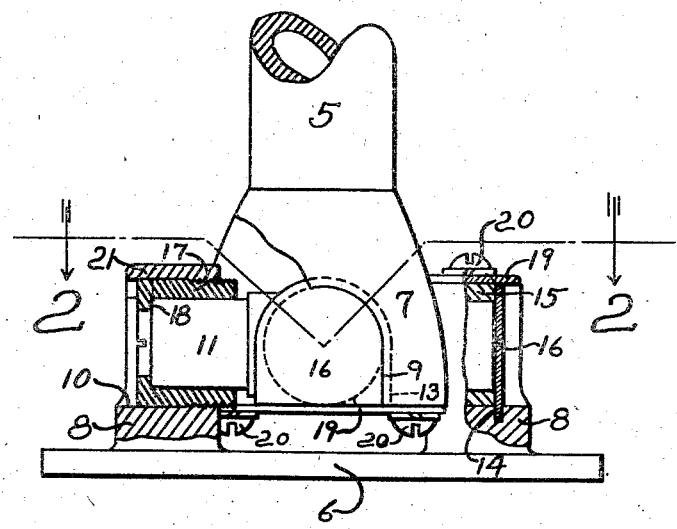
INVENTOR
CHARLES D CUTTING.
BY
ATTORNEY Patented June 17, 1930

1,764,829

UNITED STATES PATENT OFFICE

CHARLES D. CUTTING, OF DETROIT, MICHIGAN

UNIVERSAL JOINT

Application filed July 11, 1927. Serial No. 204,676.

This invention relates to universal joints, the primary object being the provision of a construction for the same that will be simple in design, efficient in use, that will employ a minimum of parts and will be economical to manufacture.

A further object is to provide a universal joint construction in which a fixed stop is provided for limiting the movement of the arms in each of the yoke members against axial movement in one direction, and provided with an adjustable stop for limiting such arms against axial movement in the opposite direction.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention,—

Fig. 1 is a plan view of a universal joint, parts of which have been broken away and other parts of which are shown in section to better illustrate the same.

Fig. 2 is a view taken substantially on the line 2—2 of Fig. 1.

In the accompanying drawing which illustrates a suitable embodiment of the present invention, a pair of yoke members 5 and 6 are shown as being each provided with a pair of spaced arms 7 and 8 respectively. The arms 7 are provided with a pair of aligned openings 9 opening onto the end surface of the same, and the arms 8 are provided with a pair of similarly situated aligned openings 10, the openings 9 and 10 being provided for the reception of the arms 11 of the cross 12. Formed in the walls of one of the openings 9 adjacent the outer end thereof is a recess 13, a similar recess 14 being formed in the walls of one of the openings 10, and received in these openings and axially slidable therein are the bushings or bearing sleeves 15 which embrace the corresponding cross arms 11. Received within each recess 13 and 14 is a stop member 16 closing the respective openings 9 and 10 at that point, and abutting against the adjacent ends of the sleeves 15 and cross arms 11. The other openings 9 and 10 for the arms 7 and 8 are threaded and received therein are the threaded bushings or bearing sleeves 17 each of which is provided at its outer end with an inwardly turned flange forming an end bearing surface 18 for the corresponding end of the cooperating cross arm 11 received therein. A plain cap 19 is secured by the screws 20 over the end face of each of the yoke arms in which the sleeves 15 are received, the screws 20 drawing the caps 19 radially over the sleeves 15 into contact therewith, and the ends of the yoke arms within which the threaded sleeves 17 are received are provided with caps 21 internally threaded to correspond with the threaded exterior of the sleeves 17 and are secured to their corresponding yoke arms by the screws 22 in the same manner as the caps 19 previously referred to. The caps 19 prevent displacement of the stop 16 and the caps 21 lock the bearing sleeve 17 in axially adjusted position.

In practice, the arms 11 of the cross 12 are inserted in the openings 9 and 10 of the yokes, the sleeves 15 are slipped into place and the caps 19 are secured in place by the screws 20. The sleeves 17 are then threaded into the corresponding openings 9 and 10 until the bearings 18 contact with the respective ends of the arms 11 and force the end of the diametrically opposite arm into contact with the corresponding stop 16. The caps 21 are then applied and secured in place by the screws 22 which thereby lock the sleeves 17 from either rotary or axial movement.

It will be apparent from the foregoing that the construction described provides an extremely simple and efficient joint and one which is very economical to manufacture. By providing the fixed stops 16 for the alternate cross arms 11 and providing each of the opposite bearing sleeves, which are adjustable, with a stop for the corresponding arms 11, the cost of manufacture is materially reduced while still retaining the feature of adjustably compensating for wear due to the end thrust of the arms 11.

Formal changes may be made in the specific embodiment of the invention described without departing from the spirit and substance of the broad invention, the scope of which is commensurate with the appended claims.

What I claim is:

1. A universal joint comprising a pair of yokes, bearings in each of the yoke arms, bearing members in the bearings, and end thrust bearings for each of the bearing members, one of the end thrust bearings for each yoke arm being fixed and the other being adjustable.

2. A universal joint comprising a pair of yokes, openings in said yokes, bearing sleeves in said openings, a member provided with arms received in said openings, one bearing sleeve in each of said yokes being axially adjustable and provided with a bearing surface for the end of the corresponding arm, and a fixed stop for the end of the other arm in each yoke.

3. A universal joint comprising a pair of yokes, a cross, openings in the ends of said yokes for receiving the arms of said cross, bearing sleeves received in said openings about said arms, a fixed stop for one of said arms in each of said yokes, and an adjustable stop for the other of said arms in each of said yokes.

4. A universal joint comprising a pair of yokes, openings in the ends of said yokes, a cross, arms on said cross received in said openings, bearing sleeves embracing said arms and positioned in said openings, an axially fixed stop member engaging the end of one of said arms in each of said yokes, an abutment carried by each of the others of said sleeves bearing against the end of the corresponding arm, said last mentioned sleeves being axially adjustable, and means for locking said last mentioned sleeves against movement.

5. A universal joint comprising a pair of members each provided with a pair of spaced arms, openings in said arms bearing sleeves in said openings, a cross, the arms of which are received in said sleeves, a fixed stop carried by one arm of each of said members for limiting axial movement of said cross arms in one direction, stops for the remainder of said cross arms carried by the corresponding sleeves, means for axially adjusting the last mentioned sleeves, and means for clamping all of said sleeves against movement.

6. A universal joint comprising a pair of yoke members, openings in the ends of said members, bearing sleeves in said openings, a cross having arms received in said sleeves, a fixed stop carried by each of said yoke members for limiting axial movement of said arms in one direction, and a stop carried by one of said sleeves in each of said yoke members adjustable therewith for limiting axial movement of said arms in a direction opposite to the first mentioned direction.

7. A universal joint comprising a pair of yokes, a pair of aligned openings in each of said yokes, bearing sleeves in said openings, one of said bearing sleeves in each of said yokes threadably engaging its corresponding opening and being provided with an end bearing surface, an axially fixed stop limiting axial movement of the other of said bearing sleeves in each of said yokes, and a member provided with bearing arms received in said bearing sleeves, said arms held against axial movement between said end bearing surfaces and said fixed stops.

8. A universal joint comprising a pair of yokes each provided with an opening in the end of each arm thereof, each of said openings breaking through the end surface of its arm, a bearing sleeve in each of said openings, a cross having its arms embraced in said sleeves, a groove in the walls of one of said openings in each of said yokes, a stop member received in each of said grooves in contact with the outer ends of the corresponding arms and sleeves, a cap for securing said stop member against displacement, the remainder of said sleeves threadably engaging their respective openings and being provided with end walls in contact with the corresponding arms of said cross, and a cap for the last mentioned sleeves threadably engaging the same to clamp them against movement.

9. A universal joint comprising a pair of yoke members, aligned openings in the ends of the arms of each yoke member, said openings opening at their sides on the end surfaces of said arms, a bearing sleeve in each of said openings, a cross provided with a plurality of arms one each of which is received in each of said sleeves, an axially fixed stop in contact with the outer end of one of said sleeves in each yoke member, the other of said sleeves in each of said yoke members threadably engaging their respective openings for axial adjustment therein, and a cap for each of said openings engaging a side of the corresponding sleeve, said caps preventing displacement of said stops and locking said threaded sleeves against rotation.

10. A universal joint comprising a pair of yoke members, an opening in the end of each arm of each yoke member, an axially slidable sleeve received in one of said openings of each of said members, a sleeve threadably engaging the other opening of each of said members, a cross having arms received in said sleeves, a stop member carried by each of said yoke members bridging said openings provided with said axially slidable sleeves and abutting against the ends of said axially slidable sleeves and the corresponding cross arms, an abutment carried by each of said threaded sleeves contacting against the end of the corresponding cross arms, and a plurality of caps each engaging the circumferential surface of a sleeve for preventing rotation thereof.

11. A universal joint comprising a pair of yokes, an opening in the end of each yoke arm, a bearing sleeve in each of said openings, a cross, arms on said cross each received in one of said sleeves, a member extending across one of said openings of each of said yokes in contact with the corresponding arm and fixed against movement axially of said openings, the remainder of said sleeves being axially adjustable in their respective openings, and means for locking said remainder of said sleeves in axially adjusted position.

12. A universal joint comprising a pair of yokes, a pair of connected bearing arms for each yoke, a groove in at least one yoke arm, a fixed end thrust abutment in said groove locating the bearing arm therein, and an adjustable end thrust abutment in the opposed yoke arm, whereby the connected bearing arms in said yoke arms may be located and held.

13. A univerasal joint comprising a pair of yokes and bearing members mounted therein, grooves in at least some of said yokes adjacent the ends of the bearing members which are positioned therein, and plate like members seated in said grooves, held in three directions by the grooves, each acting to resist end thrust from its adjacent bearing.

14. A universal joint having bearing members and supports therefor, grooves in at least some of said supports adjacent the ends of the bearings carried thereby, and plate like members in said grooves, held in three directions by the grooves, each acting to resist end thrust from its adjacent bearing.

15. A universal joint having bearing members and supports therefor, opposed grooves in at least some of the supports adjacent the ends of the bearings carried thereby, and plate-like members each having its sides engaged in said opposed grooves and held in said grooves to resist end thrust from its adjacent bearing member.

16. A universal joint comprising a pair of yokes and bearing members mounted therein, opposed grooves in at least some of the yoke arms adjacent the ends of the bearing members which are positioned therein, and plate-like members each having its sides engaged in said opposed grooves and held in said grooves to resist end thrust from its adjacent bearing member.

CHARLES D. CUTTING.